Patented Jan. 11, 1938

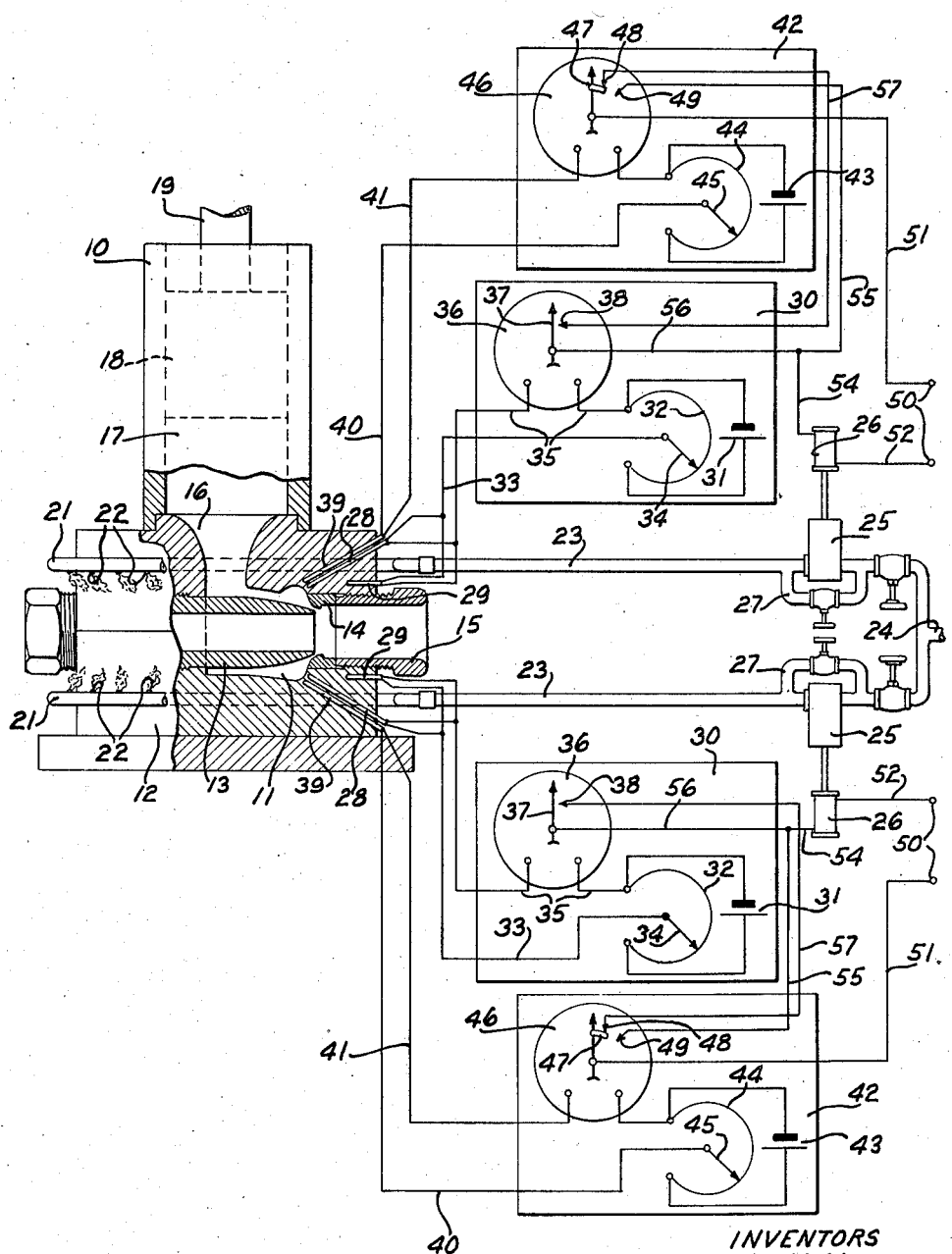

2,105,083

UNITED STATES PATENT OFFICE 2,105,083

TEMPERATURE CONTROL MEANS FOR EXTRUSION APPARATUS

Walter W. Kagi, La Grange, and Randall Gillis, Hinsdale, Ill., assignors to Western Electric Company, Incorporated, New York, N. Y., a corporation of New York Application September 25, 1936, Serial No. 102,500

10 Claims. (Cl. 207—16)

This invention relates to the manufacture of extruded articles, and more particularly to the extrusion of cable sheath.

Certain types of electric cables are provided with a protective covering of lead or lead alloy which is extruded over the cable core in a suitable machine, such as the sheathing apparatus disclosed in U. S. Patent 699,308, issued May 6, 1902 to R. F. Hall. In this equipment the lead or alloy is fed to the apparatus in molten form, cooled for a definite period and applied to the core in a plastic condition. The thermal condition of the material during extrusion is an important element in the satisfactory operation of the process and the quality of the resultant sheath. The optimum extrusion range for certain lead alloys containing small quantities of calcium is particularly critical as disclosed in U. S. Patent 2,049,938 issued August 4, 1936 to H. A. Anderson et al.

Accurate temperature control is complicated by the intermittent operation of the process. During extrusion, large quantities of friction heat are developed, while during the cooling periods heat is removed from the material and apparatus. The extrusion pressures employed are substantial, necessitating the use of massive machine members which conduct heat unequally to and from different portions of the extrusion chamber and tend to create a temperature unbalance.

An object of this invention is to maintain the temperature of heated material accurately and uniformly within prescribed limits.

In accordance with one embodiment of this invention apparatus is provided for maintaining extrudable material in a cable sheathing apparatus within a prescribed temperature range by means of independent and automatically controlled heating elements applied to different portions of the apparatus. The upper and lower portions of a chamber containing the material are provided with external heaters, each controlled by thermocouples imbedded in their respective portions of the chamber wall and connected to a potentiometer controller for regulating the supply of energy to the heaters. Each control unit includes one thermocouple located near the extrudable material connected in parallel with another thermocouple positioned near the periphery of the chamber wall to obtain an average response from these areas and a third thermocouple positioned near the extrudable material for supplementary regulation of the heaters when the material reaches the desired maximum or minimum temperature.

A more complete understanding of the invention may be had from the following detailed description taken in conjunction with the appended drawing, in which the single figure is a schematic view, partly in section, of a cable sheathing press provided with automatic temperature control apparatus embodying the invention.

In the attached drawing, apparatus is shown for controlling the temperature of extrudable material in a conventional cable sheathing press 10. In the operation of this press the cable core enters an extrusion chamber 11 enclosed in a die block 12 through a core tube 13 which is supported in the left end of the block and extends longitudinally through the block to the right end of the chamber. At the exit end of the chamber a sizing die 14 is mounted adjacent to the end of the core tube and spaced therefrom by means of a sizing die holder 15 which is adjustably threaded into the die block wall. A feed channel 16 in the top of the extrusion chamber communicates with a supply cylinder 17 in which a piston or ram 18 is slidably supported. The ram is connected through its shank 19 to a suitable power source (not shown). The sheathing material, usually lead, or lead alloy, is introduced to the cylinder in molten form and cooled to a temperature suitable for extrusion. The ram is then advanced in the cylinder to force the sheathing material through the adjustable space between the core tube end and the sizing die around the advancing cable core.

Satisfactory operation of the process and quality of the sheath is influenced largely by the temperature of the lead or alloy at the time of extrusion. Each type of sheathing material has a definite temperature range within which it can be extruded on the particular equipment employed, and fluctuations within this range result in defects, such as eccentric or ruffled sheath. It is, therefore, desirable to maintain the material in the vicinity of the sizing die consistently and uniformly at the temperature, or within a relatively narrow temperature range, suitable for the particular material being used.

The temperature of the material at this point is affected by various factors. During extrusion, considerable friction is developed by passage of the plastic metal through the chamber and the relatively small clearance between the core tube and sizing die. At intervals this heat generation is interrupted by the charging and cooling operations. The loss and transfer of heat may be unequal at the upper and lower portions of the chamber because of the greater mass of machine members at one portion of the chamber. This unbalanced condition, which causes sheath eccentricity, is aggravated by the practise of cooling portions of the apparatus with circulating water and also by the introduction of relatively hotter material to the top of the chamber when extrusion is resumed at the end of the cooling period.

In order to maintain the proper heat balance, the invention provides independent temperature control means to the upper and lower portions of the die block. Duplicate apparatus is employed for each portion of the block and, for convenience, the same numerals are used to identify corresponding elements in the two systems in the following description and drawing.

Each system comprises a burner 21 encircling the die block and provided with a series of longitudinally spaced apertures 22 for emitting gas, oil or other fuel which is burned in flame jets against the outer surface of the block. Fuel is fed to each burner through a separate fuel supply pipe 23 which is connected to a main supply line 24 and contains a spring depressed magnetic control valve 25 operated by a solenoid coil 26. The solenoid valve, which is responsive to the temperature of thermocouples imbedded in the block, controls the supply of fuel to its burner. A burner pilot flame is maintained by means of a by-pass 27 around the solenoid valve.

During portions of the extrusion cycle no auxiliary heat may be required from the burners, and excess heat developed by friction will travel outwardly from the contained material towards the die block periphery. When extrusion is interrupted for the charging and cooling periods, heat travels inwardly from the block and adjacent machine members to the material in the chamber. To secure an average response from these conflicting trends, thermocouples are located near the inside and outside of the block wall and connected in parallel. One of these couples 28 is located as closely as possible to the plastic material, preferably in contact therewith, at the point of extrusion near the core tube end and the other couple 29 is positioned at the periphery of the die block near the burner. The couples may be located on opposite sides of the sizing die and their exact location is dependent upon the die block construction and type of heating means employed.

The leads from the parallel couples are connected to a potentiometer controller 30 of conventional construction which comprises a battery 31 in series with the resistance wire 32 of a slide wire resistance. One of the leads 33 from the paralleled couples is secured to the variable arm 34 of this resistance and the other lead 35 is connected to one terminal of the slide wire through a galvanometer 36.

In accordance with the usual operation of this type of controller the known electromotive force in the potentiometer circuit supplied by the battery is opposed by the electromotive force generated by heating of the thermocouples. When these potentials are equal, no current will flow in the galvanometer circuit, but when the forces are unequal a proportionate flow will result to actuate the galvanometer. The galvanometer is provided with a movable contact 37 and a stationary contact 38 which are joined when the current flow in the couple circuit reaches a predetermined value as regulated by the setting of the slide wire resistance. The thermocouple circuit is short and its electrical resistance is low compared with the resistance of the potentiometer circuit. Under these conditions the potential developed by the couple circuit indicates the approximate average of the temperatures of the individual couples.

A third thermocouple 39 is located in the block close to or in contact with the material at the sizing die to indicate the temperature at this critical point independently. This couple is connected through leads 40 and 41 to a potentiometer controller 42 which is the same in general construction and operation as the controller previously described and has a battery 43, slide wire 44 and variable arm 45. A galvanometer 46 in series with one of the couple leads 41 has three contacts. One of these contacts 47 mounted on the moving galvanometer member is elongated and engages a fixed contact 48 during any period that the temperature of the couple remains within a predetermined range. When the couple temperature reaches a predetermined minimum value this connection is broken and a low temperature contact 49 is engaged by the moving contact.

The two controllers regulate the flow of electrical power between the solenoid coil 26 and a suitable power source 50. One power lead 51 is connected to the moving elongated contact 47 in the single couple controller, and the other power lead 52 is secured to one terminal of the solenoid coil. The other coil terminal 54 is connected to the low temperature contact 49 in the single couple controller through a wire 55 and also to the moving contact 37 in the parallel couple controller through a wire 56. The fixed contact 38 in the parallel couple controller is connected to the range contact 48 in the single couple controller by means of a wire 57.

In the operation of the control apparatus, the solenoid valve is held open by the energized coil permitting fuel to flow to the appropriate burner as long as the temperature of the extrudable material, as registered by the single thermocouple, remains below a minimum value, indicated by engagement of the low temperature contact 49. At any time that the single thermocouple is within the permissible temperature range, as indicated by joining of the elongated moving contact 47 and the range contact 48, the solenoid is controlled by the parallel couple controller. If the material in this portion of the chamber measured by the single thermocouple exceeds the maximum desired temperature, the parallel couple controller is disconnected from the solenoid circuit by separation of contacts 47 and 48. With this construction the single couple functions as a safety element and the major control is exercised by the parallel couples.

The temperatures at which the various contacts respond are regulated by means of the slide wire resistances and location of the fixed contacts on their supports. The settings are determined by the extrusion characteristics of the sheathing material employed. For example, an alloy of lead containing approximately .03% calcium extrudes satisfactorily at 475° F. and for best results should be maintained between 465° F. and 485° F. When extruding this alloy the low temperature contact in the single couple controller is set to close when the temperature of its couple is below the minimum value of 465° and the range contact is engaged when the temperature is within the permissible range of 465° to 485°. This insures steady application of heat to the proper portion of the die block whenever the temperature of the alloy in the corresponding portion of the extrusion chamber is below 465° and prevents operation of the burner when the material temperature exceeds 485°.

The parallel couple controllers are set to anticipate the effect of heat travel lag between the inner and outer portions of the block wall and thus prevent objectional fluctuations in material temperatures. The setting of these controllers is dependent upon the construction of the extrusion apparatus, the type of heating elements employed and speed of extrusion, as these factors affect the loss and transfer of heat. Also, it may be desirable to set the upper and lower controllers at different values to secure the best results. In one satisfactory installation, the upper controller was set to operate the burner when the average temperature in its parallel couples was below 473° and the lower controller was set to operate at temperatures up to 480°. In another installation the upper controller was set at 500° and the lower controller at 460°. For other installations, it may be necessary to further vary these values to maintain the alloy uniformity at the optimum temperature. When extruding other alloys, or lead, the controllers are set in accordance with the extrusion characteristics of the particular material used and the apparatus employed.

The apparatus disclosed herein can be used for controlling the operation of electrical heating elements instead of burners, and also to regulate the introduction of a cooling means to the extrusion apparatus. For example, the introduction of water or vapor to apertures in the extrusion chamber wall can be controlled by responses from the couples to circulate the water in proper quantities to withdraw heat from the required portion of the chamber.

Other feasible modifications of the specific embodiment above disclosed will be apparent, and it is to be understood that the invention is limited only by the scope of the appended claims.

What is claimed is:

1. An extrusion apparatus, comprising a walled chamber, means for heating the chamber wall, means for measuring the temperatures at the inner and outer portions of the chamber wall, and means responsive to the average of said temperatures for controlling the heating means.

2. An extrusion apparatus, comprising a chamber, means for feeding extrudable material to the chamber, means for heating the chamber, a thermocouple for measuring the temperature of the material in the chamber, a thermocouple for measuring the temperature of the exterior portion of the chamber, and means responsive to the average temperature of the couples for controlling the heating means.

3. In an extrusion apparatus, a walled chamber for extrudable material, heating elements for the chamber wall, means for measuring the temperatures of the inner and the outer portions of the wall, and means for causing operation of the heating elements when the approximate average of the inner and outer wall portion temperatures reaches a predetermined value.

4. In an extrusion apparatus, an extrusion chamber, means for feeding extrudable material to the chamber, a burner for heating the chamber, a fuel supply line for the burner and a control for the fuel supply, comprising a magnetic valve in the fuel supply line, a pair of thermocouples in the chamber wall, one couple being adjacent to the material in the chamber and the other radially farther from the chamber interior, and means for operating the magnetic valve when the approximate average of the couple temperatures reaches a predetermined value.

5. An extrusion apparatus, comprising a walled chamber, means for feeding extrudable material to the chamber, heating elements applied to the chamber, means for measuring the temperature of the material, means for measuring the temperature of the external part of the chamber wall, and means responsive to the temperature measuring means for operating the heating element when the average of the material and exterior wall portions reach a predetermined value and the material temperature is within a specified range.

6. An extrusion apparatus, comprising a walled chamber, means for feeding extrudable material to the chamber, a burner for heating the chamber, a fuel supply for the burner, a magnetic valve for controlling the fuel supply, a plurality of thermocouples for measuring the temperatures of the material in the chamber and the external portion of the chamber wall, means responsive to the couples for opening the valve when the mean of the temperatures of the materal and external wall portion reaches a predetermined value, and means responsive to the couples for preventing the opening of the valve when the temperature of the material exceeds a predetermined value.

7. An extrusion apparatus, comprising a walled chamber, means for feeding extrudable material to the chamber, means for heating the chamber, a pair of thermocouples located in the wall of the chamber and connected in parallel, one of the couples being positioned adjacent to the material in the chamber and the other couple being located in the outer portion of the chamber wall, and means responsive to the paralleled couples for controlling the heating means.

8. In an extrusion apparatus, a walled chamber for receiving extrudable material, a burner for heating the chamber, means for measuring the temperature of the material in the chamber, means for measuring the temperature of the chamber wall, means responsive to the temperature measuring means for operating the burner when the average of the measured temperatures reaches a predetermined value, and means for preventing operation of the burner when the temperature of the material is outside of a specific range.

9. In an extrusion apparatus, a cylinder, a walled extrusion chamber connected thereto having its axis transverse to the axis of the cylinder, separate means for heating portions of the chamber remote from and adjacent to the cylinder, and means for operating each of the heating means comprising a thermocouple positioned near the material in the chamber, a thermocouple positioned near the outer portion of the chamber wall, and a controller responsive to the average temperature of the couples for operating the heating means.

10. In an extrusion apparatus, a walled chamber for receiving extrudable material, a heater exterior to the chamber, a thermocouple close to the material in the chamber, a second thermocouple connected in parallel with the first couple and positioned at the outer portion of the chamber wall, a third thermocouple close to the material, and a controller responsive to the three thermocouples for operating the heater when the average temperatures of the paralleled couples reaches a predetermined value and the temperature of the third couple is within a specified range.

WALTER W. KAGI.
RANDALL GILLIS.